United States Patent
Kim et al.

(10) Patent No.: US 10,229,762 B2
(45) Date of Patent: Mar. 12, 2019

(54) COOLING SYSTEM OF EMERGENCY COOLING TANK AND NUCLEAR POWER PLANT HAVING THE SAME

(71) Applicant: KOREA ATOMIC ENERGY RESEARCH INSTITUTE, Daejeon (KR)

(72) Inventors: Young In Kim, Daejeon (KR); Keung Koo Kim, Daejeon (KR); Young Min Bae, Daejeon (KR); Ju Hyeon Yoon, Daejeon (KR); Jae Joo Ha, Daejeon (KR); Won Jae Lee, Seoul (KR); Tae Wan Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1426 days.

(21) Appl. No.: 14/271,316

(22) Filed: May 6, 2014

(65) Prior Publication Data
US 2014/0334590 A1 Nov. 13, 2014

(30) Foreign Application Priority Data

May 8, 2013 (KR) ........................ 10-2013-0052051

(51) Int. Cl.
*G21C 15/18* (2006.01)
*G21C 13/02* (2006.01)
(Continued)

(52) U.S. Cl.
CPC ............. *G21C 15/18* (2013.01); *G21C 13/02* (2013.01); *G21C 15/12* (2013.01); *G21D 3/06* (2013.01); *Y02E 30/40* (2013.01)

(58) Field of Classification Search
CPC ........ G21C 15/18; G21C 9/004; G21C 15/12; G21D 3/06
See application file for complete search history.

(56) References Cited

U.S. PATENT DOCUMENTS 5,694,442 A * 12/1997 Cinotti ................. G21C 15/18
376/298
5,699,394 A * 12/1997 Schreiber ............... G21C 11/08
376/280

(Continued)

FOREIGN PATENT DOCUMENTS

CN 101149990 3/2008
CN 101221823 7/2008
(Continued)

OTHER PUBLICATIONS

Castleberry, Gary. Babcock & Wilcox Pressurized Water Reactors. 2009. Available online: <https://pdhonline.com/courses/e183/e183content.pdf>. p. 4.*

(Continued)

*Primary Examiner* — Lily C Garner
(74) *Attorney, Agent, or Firm* — Scully Scott Murphy and Presser; Frank Digiglio

(57) ABSTRACT

The present disclosure provides a cooling system of an emergency cooling tank, which enables long-term cooling without refilling cooling water, in case of the change in a quantity of heat transferred to the emergency cooling tank according to a lapse of time upon an occurrence of an accident of a nuclear reactor, and a nuclear power plant having the same. The emergency cooling tank cooling system includes an emergency cooling tank, a heat exchanging device installed to be exposed to an outside of the emergency cooling tank to operate in air, and configured to externally emit such that the operation of the emergency cooling tank is continued even without refilling the cooling water, and an opening and closing unit installed at an upper portion of the emergency cooling tank to be located higher than a water level of the cooling water.

7 Claims, 13 Drawing Sheets

(51) Int. Cl.
*G21C 15/12* (2006.01)
*G21D 3/06* (2006.01)

(56) References Cited

U.S. PATENT DOCUMENTS

| | | | | |
|---|---|---|---|---|
| 2009/0245453 | A1* | 10/2009 | Jeong | G21C 15/18 376/299 |
| 2013/0064342 | A1* | 3/2013 | Lee | G21C 15/18 376/298 |

FOREIGN PATENT DOCUMENTS

| | | | |
|---|---|---|---|
| CN | 101441902 | | 5/2009 |
| CN | 101719386 | | 6/2010 |
| CN | 101719386 A | * | 6/2010 |
| CN | 102332313 | | 1/2012 |
| CN | 202615805 U | | 12/2012 |
| JP | 2-176596 | | 7/1990 |
| JP | 06-242279 | | 9/1994 |
| JP | 06242279 A | * | 9/1994 |
| KR | 10-2009-0021722 | | 3/2009 |
| KR | 10-1200216 | | 11/2012 |
| KR | 101242743 B1 | | 3/2013 |

OTHER PUBLICATIONS

Notice on the First Office Action (translation) for CN 201410182406.6, dated Feb. 16, 2016, 18 pages.
Passive Residual Heat Removal System Design for Advanced Reactor (2011) pp. 4-10.
Office Action in Korean Patent Application No. 10-2013-0052051, dated Jul. 15, 2014, 6 pages.
Search Report for French Patent Application No. 1454122, dated Oct. 26, 2017, 5 pages.

* cited by examiner

COOLING SYSTEM OF EMERGENCY COOLING TANK AND NUCLEAR POWER PLANT HAVING THE SAME

CROSS-REFERENCE TO RELATED APPLICATION

Pursuant to 35 U.S.C. § 119(a), this application claims the benefit of earlier filing date and right of priority to Korean Application No. 10-2013-0052051, filed on May 8, 2013, the contents of which is incorporated by reference herein in its entirety.

BACKGROUND OF THE DISCLOSURE

1. Field of the Disclosure

This specification relates to a cooling system of an emergency cooling tank with improved safety, which is capable of minimizing an increase in economical costs and maintaining a cooling function of the emergency cooling tank for a long term of time without refilling cooling water in the emergency cooling tank, by taking into account a characteristic of a quantity of heat transferred to the emergency cooling tank, as an ultimate heat sink, upon an occurrence of an accident of a nuclear reactor, and a nuclear power plant having the same.

2. Background of the Disclosure

An emergency cooling tank is used as a heat sink, which removes heat of a nuclear reactor upon an occurrence of an accident, in various types of nuclear reactors including an integral nuclear reactor. The heat of the nuclear reactor is ultimately transferred to the emergency cooling tank via a passive residual heat removal system (heat within the nuclear reactor) or a passive containment (building) cooling system (heat emitted into a containment). Accordingly, cooling water within the emergency cooling tank is evaporated such that the heat is emitted to the air.

A heat exchanger of the passive residual heat removal system is employing a water-cooling type (SMART nuclear reactor in Korea or AP1000 of Westinghouse Co. Ltd., in USA), an air-cooling type (SCOR in France), or a hybrid-cooling type (IMR in Japan) combining the water-cooling and the air-cooling.

In general, the water-cooling type heat exchanger has an advantage in fabrication of a heat exchanger with a small scale by virtue of excellent cooling efficiency. However, cooling water within the emergency cooling tank, to which the heat is transferred from the heat exchanger upon an occurrence of an accident, is gradually evaporated to be run out. Accordingly, the cooling water in the emergency cooling tank has to periodically be refilled for long-term cooling exceeding a cooling water storage capacity.

On the other hand, the air-cooling type heat exchanger does not have an emergency cooling tank, accordingly, there is no need to periodically refill the cooling water. However, the air-cooling type heat exchanger exhibits lower cooling efficiency than the water-cooling type. The heat transfer efficiency of transferring heat to the outside (to the air) through the wall surface of the tube is low. The efficiency of the air-cooling type heat exchanger depends on heat transfer efficiency of a wall surface of a tube with which air comes in contact. Consequently, an increase in a size (capacity) of the heat exchanger is required.

Also, the hybrid-cooling type heat exchanger also exhibits a heat transfer performance which is decreased extremely lower than the water-cooling type at the time point of operating in an air-cooling manner. Thus, it requires for a greater size than the water-cooling type heat exchanger.

In order to cool an inside of the heat exchanger of the passive residual heat removal system, a condensation heat exchanger of a steam condensation type with excellent heat transfer efficiency is employed. Since the heat exchanger of the passive residual heat removal system is generally operating under high temperature and high pressure environments, design pressure thereof may be extremely high and economic feasibility is drastically lowered when the heat exchanger has an increased size.

The nuclear reactor does not always transfer constant heat upon an occurrence of an accident thereof. Unlike a typical boiler, the nuclear reactor generates residual heat from its core for a considerably long-term of time even after a shutdown of the core of the nuclear reactor. Accordingly, when the nuclear reactor is shut down due to an accident or the like, a large quantity of residual heat is emitted from the core at the beginning of the accident. As the time elapses, the emitted residual heat is drastically reduced. In turn, the heat transferred from the nuclear reactor into the emergency cooling tank is remarkably reduced according to the lapse of time after the occurrence of the accident.

In the related art emergency cooling tank, the emergency cooling tank has a top open due to an accident characteristic of the nuclear reactor. When heat is transferred to the emergency cooling tank upon an occurrence of an accident, the cooling water within the emergency cooling tank, to which the heat is transferred, is increased in temperature and evaporated so as to be changed into a phase of steam. The steam is externally emitted through the open top of the emergency cooling tank. Consequently, a heat load is treated by evaporation heat.

However, the related art structure had the problem that the cooling water within the emergency cooling tank is gradually reduced to be run out, due to a long-term operation of the emergency cooling tank. When the cooling water within the emergency cooling tank is depleted, the emergency cooling tank lost its function. Hence, unless it is refilled with cooling water in a periodic manner, there is a limitation in maintaining the function for a long term of time. Further, when the use of an electric power system for refilling the cooling water is stopped for an extended time upon an occurrence of an accident exceeding a design reference, the accident level might extend to a severe accident.

SUMMARY OF THE DISCLOSURE

Therefore, an aspect of the detailed description is to provide a cooling system of an emergency cooling tank, capable of maintaining a function of the emergency cooling tank for an extended time even when it is impossible to refill the emergency cooling tank due to an impossible use of an electric power system.

Another aspect of the detailed description is to provide a nuclear power plant with improved safety, by constructing a cooling system, which operates under lower pressure of an atmospheric pressure level, together with an emergency cooling tank, so as to minimize an increase in economic costs by taking into account of a characteristic of a quantity of heat transferred to the emergency cooling tank upon an accident occurred in a nuclear reactor, and also maintain a cooling function of the emergency cooling tank for a long term of time even without refilling cooling water in the emergency cooling tank.

To achieve these and other advantages and in accordance with the purpose of this specification, as embodied and broadly described herein, there is provided a cooling system of an emergency cooling tank, including an emergency cooling tank configured to store therein cooling water, which receives heat from a nuclear reactor or a containment when an accident occurs in the nuclear reactor, a heat exchanging device installed to be exposed to an outside of the emergency cooling tank to operate in air, and configured to externally emit heat by way of a heat exchange between a fluid within the emergency cooling tank and the air such that the operation of the emergency cooling tank is continued even without refilling the cooling water, and an opening and closing unit installed at an upper portion of the emergency cooling tank to be located higher than a water level of the cooling water, and configured to be open by a flow of fluid generated by an evaporation of the cooling water, the flow being formed due to a pressure difference from external air at pressure higher than a preset pressure, such that some of the fluid is externally emitted when a heat load exceeding a cooling capacity of the emergency cooling tank is transferred.

In accordance with one exemplary embodiment disclosed herein, the heat exchanging device may include a duct installed on an upper portion of the emergency cooling tank and extending upwardly to provide an upward flow path to the fluid within the emergency cooling tank, and a heat exchanging portion configured to perform the heat exchange with air to cool or condense the fluid introduced through the duct. The heat exchanging portion may be connected to the emergency cooling tank to collect the fluid which has lost heat and flows down due to a density difference.

The heat exchanging portion may have at least a part formed in a combined shape of a curved pipe and a straight pipe, or in a helical shape so as to ensure a sufficient heat-exchange area with the air.

In accordance with another exemplary embodiment disclosed herein, the heat exchanging device may include a first heat exchanger installed in the emergency cooling tank to receive heat transferred from the fluid within the emergency cooling tank, and a second heat exchanger connected to the first heat exchanger by a connecting line to form a closed loop in which circulating fluid flows, and installed at the outside of the emergency cooling tank to emit heat, transferred from the first heat exchanger to the circulating fluid, to the air.

Each of the first and second heat exchangers may include a tube configured to perform the heat exchange with the fluid within the emergency cooling tank or the air, and formed in a shape of bundle for sufficiently ensuring a heat-exchange area, and headers configured to distribute the circulating fluid into each tube at an inlet of the tube and join the distributed fluids at an outlet of the tube.

The tube may have at least a part formed in a combined shape of a curved pipe and a straight pipe or in a helical shape so as to ensure a sufficient heat-exchange area with the air.

The first heat exchanger may be installed at a position higher than a water level of the emergency cooling tank for the heat exchange with steam or air within the emergency cooling tank.

The first heat exchanger may have at least a part sunk in the cooling water of the emergency cooling tank for the heat exchange with steam, air or the cooling water within the emergency cooling tank.

The first heat exchanger may have at least a part inclined along a flowing direction of the circulating fluid for natural circulation of the circulating fluid to rise up due to a density change.

The second heat exchanger may extend downward to be connected to the first heat exchanger such that the circulating fluid, condensed after transferring heat to air, circulates to the first heat exchanger.

The emergency cooling tank cooling system may further include a pressurizer connected to the pipe to prevent overpressure of the heat exchanging device, and configured to accommodate fluid expanded or contracted by a temperature change.

The pressurizer may contain refilling water therein to refill the circulating fluid circulating along the heat exchanging device.

In accordance with another exemplary embodiment disclosed herein, the emergency cooling tank cooling system may further include an air circulating unit installed on the emergency cooling tank in a manner of covering at least part of the heat exchanging device, and configured to allow air introduced through a lower portion thereof to flow up therealong so as to increase a heat exchange rate of the heat exchanging device by natural convection.

In accordance with another exemplary embodiment disclosed herein, the opening and closing unit may be implemented as a type of check valve or flap valve, which is passively open at pressure higher than a preset pressure formed by the fluid within the emergency cooling tank.

In accordance with another exemplary embodiment disclosed herein, the opening and closing unit may prevent the emission of steam when a heat load transferred to the emergency cooling tank is reduced below the cooling capacity of the emergency cooling tank, and may be passively closed at pressure lower than a preset pressure to maintain a quantity of the cooling water of the emergency cooling tank.

Also, to achieve those aspects and other advantages of the detailed description, there is provided a nuclear power plant having an emergency cooling tank cooling system.

The nuclear power plant may include a passive containment cooling system configured to condense steam emitted from a nuclear reactor into a containment to prevent an increase in pressure of the containment when an accident occurs in the nuclear reactor, and an emergency cooling tank cooling system configured to receive sensible heat and residual heat of the nuclear reactor, transferred from the passive containment cooling system, and externally emit the received heat, wherein the emergency cooling tank cooling system may include an emergency cooling tank configured to store therein cooling water, which receives heat transferred from a nuclear reactor or a containment, when an accident occurs in the nuclear reactor, a heat exchanging device installed to be exposed to an outside of the emergency cooling tank to operate in air, and configured to externally emit heat by way of a heat exchange between fluid within the emergency cooling tank and the air such that the operation of the emergency cooling tank is continued even without refilling the cooling water, and an opening and closing unit installed at an upper portion of the emergency cooling tank to be located higher than a water level of the cooling water, and configured to be open by a flow of the fluid generated by an evaporation of the cooling water, the flow being formed due to a pressure difference from external air at pressure higher than a preset pressure, such that some of the steam is externally emitted when a heat load exceeding a cooling capacity of the emergency cooling tank is transferred.

In accordance with one exemplary embodiment disclosed herein, a nuclear power plant may include a passive residual heat removal system configured to remove sensible heat and residual heat of a nuclear reactor by circulating cooling water when an accident occurs in the nuclear reactor, and an emergency cooling tank cooling system configured to receive sensible heat and residual heat of the nuclear reactor, transferred from the passive residual heat removal system, and externally emit the received heat, wherein the emergency cooling tank cooling system may include an emergency cooling tank configured to store therein cooling water, which receives heat transferred from a nuclear reactor or a containment, when an accident occurs in the nuclear reactor, a heat exchanging device installed to be exposed to an outside of the emergency cooling tank to operate in air, and configured to externally emit heat by way of a heat exchange between fluid within the emergency cooling tank and the air such that the operation of the emergency cooling tank is continued even without refilling the cooling water, and an opening and closing unit installed at an upper portion of the emergency cooling tank to be located higher than a water level of the cooling water, and configured to be open by a flow of the fluid generated by an evaporation of the cooling water, the flow being formed due to a pressure difference from external air at pressure higher than a preset pressure, such that some of the fluid is externally emitted when a heat load exceeding a cooling capacity of the emergency cooling tank is transferred.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. A singular representation may include a plural representation unless it represents a definitely different meaning from the context.

Figure 1:
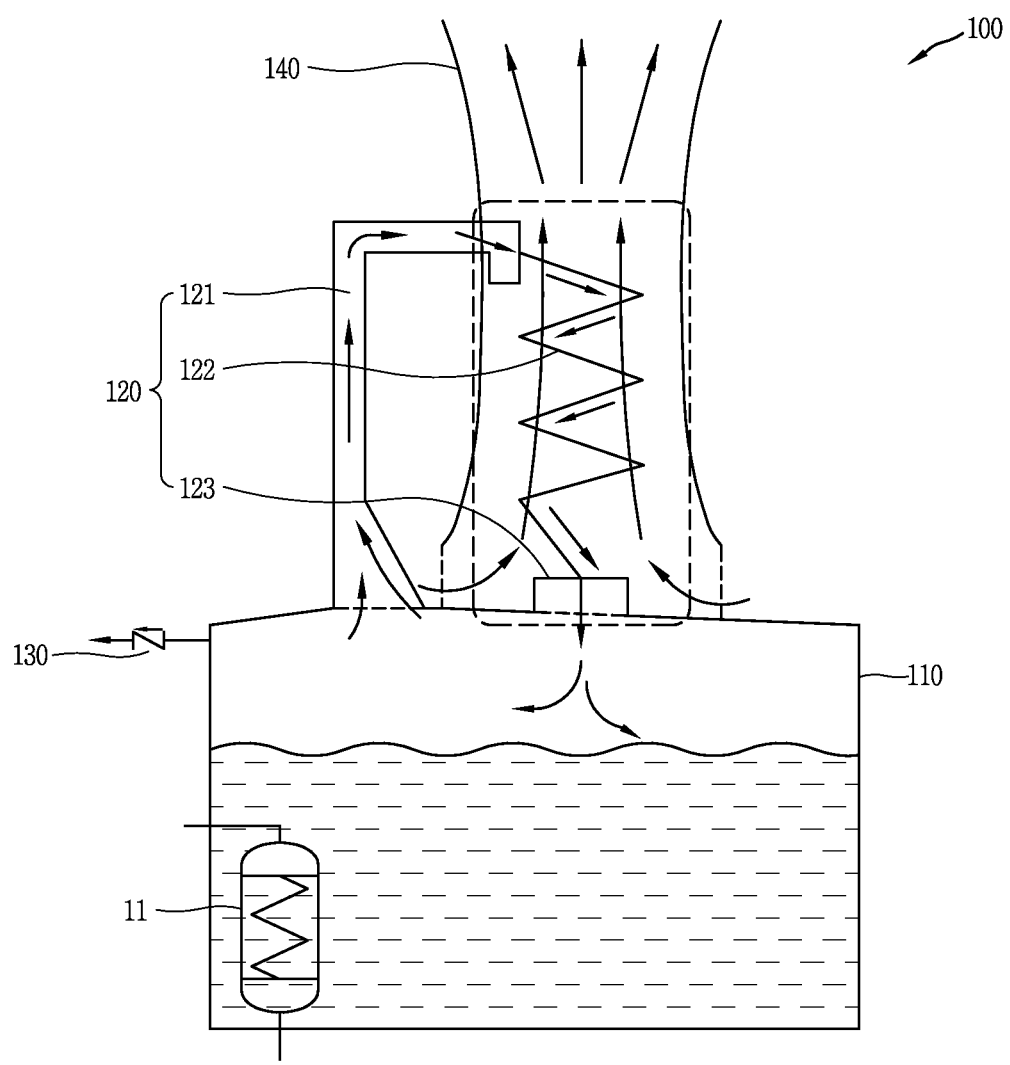
FIG. 1 is a conceptual view of a cooling system of an emergency cooling tank in accordance with one exemplary embodiment disclosed herein.

FIG. 1 is a conceptual view of a cooling system 100 of an emergency cooling tank (or an emergency cooling tank cooling system) in accordance with one exemplary embodiment disclosed herein.

An emergency cooling tank cooling system 100 may be configured to externally emit heat transferred from a nuclear reactor or a containment, and include an emergency cooling tank 110, a heat exchanging device (or a cooling device) 120 and an opening and closing unit 130.

The emergency cooling tank 110 may be configured to store cooling water therein. A condensation heat exchanger 11 may be installed in the emergency cooling tank 110. When an accident happens in a nuclear reactor, the condensation heat exchanger 11 may transfer heat from the nuclear reactor or a containment into cooling water within the emergency cooling tank 110 through a passive residual heat removal system or a passive containment cooling system. The tank generally refers to a water pool or a water tank.

When the accident happens in the nuclear reactor, residual heat is continuously generated from a core even after the core of the nuclear reactor is shut down. As a result, the passive residual heat removal system or the passive containment cooling system may continuously receive the heat from the nuclear reactor and transfer it to the cooling water within the emergency cooling tank 110 through the condensation heat exchanger 11. The emergency cooling tank 110 may serve as a heat sink which discharges the transferred heat to the air.

The heat exchanging device 120 may discharge the heat transferred to the cooling water within the emergency cooling tank 110 to the air in a heat-exchanging manner with the air. The heat exchanging device 120 may be installed at an outside of the emergency cooling tank 110 so as to perform the heat exchange between the emergency cooling tank 110 and air.

The related art emergency cooling tank does not employ an external device, such as the heat exchanging device 120.

Thus, a heat load is treated (processed) using evaporation heat generated in response to an evaporation of the cooling water within the emergency cooling tank 110. However, when the cooling water is fully evaporated to be run out, the emergency cooling tank is unable to operate any more, which causes a limitation in long-term cooling.

The heat exchanging device 120 may be installed at the emergency cooling tank 110 to address such problem so as to externally discharge the heat transferred to the cooling water within the emergency cooling tank 110 by way of the heat exchange between external air and the emergency cooling tank 110. The heat exchanging device 120 may ultimately prevent the cooling water shortage of the emergency cooling tank 110 by improving the heat exchanging method of the emergency cooling tank 110.

The operation of the heat exchanging device 120 may prevent the exhaustion of the cooling water within the emergency cooling tank 110. This may allow the emergency cooling tank 110 to continuously maintain its heat-discharge function even without refill of the cooling water.

The heat exchanging device 120 may be configured by employing a cooling method in a manner of allowing steam evaporated from the cooling water of the emergency cooling tank 110 to pass therethrough, and a cooling method by a heat exchange between a circulating fluid and the cooling water or the air in a manner of circulating the circulating fluid in a closed loop.

The heat exchanging device 120 illustrated in FIG. 1 may employ the cooling method using the steam, and may include a duct 121 and a heat exchanging portion 122.

The duct 121 may be installed on an upper portion of the emergency cooling tank 110, and extend upward to provide an upward flow path to steam which rises up in response to the transferred heat. The cooling water which has received the heat transferred from the condensation heat exchanger 11 may be evaporated to become steam. Steam of high temperature has a property to rise up due to a density difference.

The duct 121 may communicate with the emergency cooling tank 110, and the steam may be introduced into the heat exchanging device 120 through the duct 121. An inlet of the duct 121 may have a greater cross-section than the flow line such that the steam can fully be introduced therein.

The heat exchanging portion 122 may have one end connected to the duct 121 such that the steam passed through the duct 121 can be introduced. Headers 123 may be installed on an inlet and an outlet of the heat exchanging portion 122, respectively. While passing through the heat exchanging portion 122, the steam may lose heat due to the heat exchange with air so as to be cooled and condensed.

The heat exchanging portion 122 may be connected to the emergency cooling tank 110 such that the fluid which has lost heat and flows down due to the density difference can be collected back into the emergency cooling tank 110. To correspond to the structure that the duct 121 provides the upward flow path to the heat-transferred steam, the heat exchanging portion 122 may provide a downward flow line to the fluid which falls with being condensed in response to the loss of heat.

Cooling efficiency of the heat exchanging portion 122 may depend on a heat-exchange area between air and steam. The heat exchanging portion 122 may have at least part formed in a combined shape of a curved pipe and a straight pipe or in a helical shape, to ensure a sufficient heat-exchange area with air. As compared with the cooling efficiency of the heat exchanging portion 122 formed in the straight pipe and extending downward to be connected to the emergency cooling tank 110, the cooling efficiency of the heat exchanging portion 122 forming a complicated flow line may be improved by virtue of more chances for heat exchange with the air. Here, the helical pipe is difficult to be manufactured, so the shape of the heat exchanging portion 122 may be selectively applied.

The fluid which is cooled and condensed through the heat exchanging portion 122 may be collected back into the emergency cooling tank 110. Accordingly, after a heat load transferred to the emergency cooling tank 110 is reduced below a cooling capacity of the emergency cooling tank 110, the quantity of cooling water of the emergency cooling tank 110 may be maintained at a constant level.

The fluid, which is cooled while circulating along the duct 121 and the heat exchanging portion 122 and then collected back into the emergency cooling tank 110, uses a natural circulation according to a density difference. Therefore, the heat exchanging device 120 may operate even without another external device, such as a pump for heat exchange or the like.

The opening and closing unit 130 may be installed at an upper portion of the emergency cooling tank 110 to be located higher than a water level of the cooling water. The opening and closing unit 130 may be open in a state over a preset pressure so as to emit part of the steam, generated responsive to the evaporation of the cooling water, to the outside of the emergency cooling tank 110, upon a transfer of a heat load exceeding a cooling capacity of the emergency cooling tank 110.

The cooling capacity of the emergency cooling tank 110 may be decided based on a size of the tank, but in view of a design of a nuclear power plant, it may be impossible to unlimitedly increase the size of the emergency cooling tank 110. Therefore, an optimal size (capacity) of the emergency cooling tank 110 may be designed based on a construction condition of a nuclear power plant, economical efficiency, a quantity of power generated by a nuclear power plant, and the like. There may also be a limit to the cooling capacity of the emergency cooling tank 110.

At the beginning of an accident of a nuclear reactor, at which a heat load transferred to the emergency cooling tank 110 exceeds the cooling capacity of the emergency cooling tank 110, an extremely large quantity of heat is emitted. Therefore, a considerably large heat exchanging device 120 is required in order to fully treat the heat load. This may, however, cause an excessive increase in equipment costs. The present disclosure is designed in consideration of the capacity of a latter part of the accident for which residual heat is extremely reduced. Thus, only the employment of the heat exchanging device 120 of the present disclosure cannot treat all thermal load generated at the beginning of the accident. Therefore, in the early stage of the accident, the steam evaporated from the cooling water may form high pressure within the emergency cooling tank 110, and the opening and closing unit 130 may be open by the flow of the fluid formed by the pressure difference.

The steam generated in response to the evaporation of the cooling water may partially be emitted out of the emergency cooling tank 110 through the opening and closing unit 130, and partially introduced into the duct 121. Hence, in the early stage of the accident, the heat load, which exceeds the cooling capacity of the emergency cooling tank 110, may be treated by the steam emitted and the cooling by the heat exchanging device 120.

The opening and closing unit 130 may be implemented as a check valve installed on a pipe connected to the emergency cooling tank 110, or a flap valve installed on an outer wall of the emergency cooling tank 110, or the like. The check valve and the flap valve may be open in response to the flow of the fluid of high pressure formed within the emergency cooling tank 110 toward the outside. As a time elapses, the heat load transferred to the emergency cooling tank 110 may gradually be reduced. When the heat load is reduced below the cooling capacity of the emergency cooling tank 110, the check valve or the flap valve may be passively closed below a preset pressure.

When the heat load transferred to the emergency cooling tank 110 is below the cooling capacity of the emergency cooling tank 110, the heat load may fully be treated only by the heat exchanging device 120. As the opening and closing unit 130 is closed, the emission of the steam may be restricted and the heat load may be generated below the capacities of the emergency cooling tank 110 and the heat exchanging device 120. Therefore, the cooling water may all be collected such that the quantity of cooling water is maintained relatively constantly within the emergency cooling tank 110, and the shortage of the cooling water of the emergency cooling tank 110 may not occur.

Even after the opening and closing unit 130 is closed, the heat exchanging device 120 may continuously operate to cool the steam so as to externally emit the heat transferred to the emergency cooling tank 110. In addition, the cooling water within the emergency cooling tank 110 may not be externally discharged any more, with merely circulating along the heat exchanging device 120. As a result, the emergency cooling tank 110 may semi-permanently play a role of the heat sink of the nuclear power plant.

The condensation heat exchanger 11 of the passive residual heat removal system is designed with extremely high design pressure (SMART nuclear reactor: about 17 MPa). Hence, when it is increased in size for increasing the cooling capacity, extremely high fabricating costs are required. In addition, in view of the characteristic that a safety facility, such as the passive residual heat removal system, has to be conservatively designed, the size increase may bring about a drastic decrease of economical efficiency. The passive containment cooling system is also designed with higher pressure than atmospheric pressure, so it has the similar problem to the passive residual heat removal system.

On the other hand, the cooling function of the emergency cooling tank 110 may be maintained for an extended time without refilling the cooling water. The emergency cooling tank cooling system 100 may also operate under low pressure of an atmospheric pressure level. This may result in remarkable improvement of safety of the nuclear power plant and minimization of an increase in equipment costs.

The emergency cooling tank cooling system 100 may further include an air circulating unit 140 which circulates air in an air-cooling manner to cool the steam evaporated from the emergency cooling tank 110. The air circulating unit 140 may induce the heat exchange by natural convection of air. The air circulating unit 140 may be implemented as a cooling tower, a duct or a chimney.

The air circulating unit 140 may be installed above the emergency cooling tank 110 to cover an outside of the heat exchanging device 120. Air may be introduced into a lower side of the air circulating unit 140 and heat-exchanged with fluid passing through the heat exchanging device 120, thereby absorbing heat. The heat-absorbed air may rise up to be emitted out of the upper side of the air circulating unit 140. Similar to the natural circulation of the heat exchanging device 120, the air circulating unit 140 may use a natural circulation principle based on a density difference of air passing through the air circulating unit 140.

Hereinafter, a calculation of a capacity of the heat exchanging device 120 will be described. This capacity is merely illustrative, and may not be limited to this.

As one example, four of the passive residual heat removal system applied to a system-integrated modular advanced reactor (SMART, a rated output: 330 MWt) according to the present disclosure may be installed. As main assumptions used for calculating the size of the heat exchanging device 120 applicable to the SMART, i) only a heat transfer (critical path) by natural convection at the outside of a tube of the heat exchanging device 120 is taken into account, and ii) a reference time of a capacity calculation is set after 72 hours.

Besides to those, main input values for the size calculation of the heat exchanging device 120 are shown in the following Table 1.

TABLE 1

| Shape of tube | Assumed as straight pipe |
|---|---|
| Number ($N_{HX}$) | 4 |
| Diameter (d) of tube | 10~30 mm |
| Pitch (p) of tube | 2d mm |
| Available height (L) of tube | 1 m |
| Heat transfer coefficient of outer wall of tube (Air) ($h_{air}$) | 5 W/m2K |
| Tube temperature ($T_{HX}$) | 100° C. |
| External air temperature ($T_{air}$) | 40° C. |

Residual heat generated from a core after shutdown of a nuclear reactor may be obtained by Equation 1, when further considering 20% of margin in addition to ANS-73 decay heat curve.

$$\dot{Q}_{decay} = 1.2 \dot{Q}_{rated}(58116.01 + 9769.69t)^{-1/4.0108} \quad \text{[Equation 1]}$$

Residual heat after 72 hours, as a time point that the heat exchanging device 120 proposed herein normally operates, may be about 0.54% of a normal output. A quantity of heat removal required for each heat exchanging device 120 may be obtained by the following Equation 2.

$$\dot{Q}_{req} = \frac{0.0054 \dot{Q}_{rated}}{N_{HX}} \quad \text{[Equation 2]}$$

To maintain a water level of the emergency cooling tank 110 after 72 hours, a heat transfer rate by the natural convection at the outside of a tube should be greater than residual heat. This condition may be expressed by Equation 3.

$$h_{air} A (T_{HX} - T_{air}) \geq \dot{Q}_{req} \quad \text{[Equation 3]}$$

A heat transfer area A required for residual heat removal may be obtained by Equation 4.

$$A = \pi d N_{tube} L \geq \frac{\dot{Q}_{req}}{h_{air}(T_{HX} - T_{air})} \quad \text{[Equation 4]}$$

Therefore, a diameter and a number of a tube meeting the heat transfer area of Equation 4 may be obtained. Then, when those obtained tubes are arranged by considering their pitches, the results are represented as illustrated in Table 2. Table 2 shows the capacity of the heat exchanging device 120, which is calculated based on the residual heat of the SMART nuclear reactor after 72 hours.

TABLE 2

| Division | Mark | Unit | Case A | Case B | Case C | Case D | Case E |
|---|---|---|---|---|---|---|---|
| Number of heat exchangers | $N_{HX}$ | number | 4 | 4 | 4 | 4 | 4 |
| Number of tubes/each | $N_{tube}$ | number | 1600 | 1600 | 2500 | 3600 | 3600 |
| Diameter of tube | d | mm | 30 | 20 | 20 | 20 | 10 |
| Pitch of tube | P | mm | 60 | 40 | 40 | 40 | 20 |
| Height (length) of tube | L | m | 4 | 5.5 | 3.5 | 2.5 | 5 |
| Tube temperature | $T_{HX}$ | °C. | 200 | 200 | 200 | 200 | 200 |
| External air temperature | $T_{air}$ | °C. | 40 | 40 | 40 | 40 | 40 |
| Heat transfer coefficient | $h_{air}$ | W/m²K | 5 | 5 | 5 | 5 | 5 |
| Quantity of heat removal/each | $Q_{req}$ | MW | 0.45 | 0.45 | 0.45 | 0.45 | 0.45 |
| Entire box size of tube of the heat exchanging device 120 | | | | | | | |
| Height | HHX | m | 6.6 | 7.3 | 5.7 | 5.1 | 6.4 |
| Horizontal/Vertical | LHX | m | 2.4 | 1.6 | 2.0 | 2.4 | 1.2 |

The heat exchanging device 120 does not have a valve or equipment which may cause an initial accident or a single failure, but the horizontal (or vertical) length of the heat exchanging device 120 may be increased by about 15% or a height thereof may be increased by about 33% upon conservatively considering the failures.

This capacity calculation has been carried out under assumption that the tube is the straight pipe by taking convenience of maintenance and fabrication into account, but when a helical pipe is used or a pin is mounted on the tube of the heat exchanging device 200, the heat exchanging device 120 may further be reduced in capacity.

Figure 2:
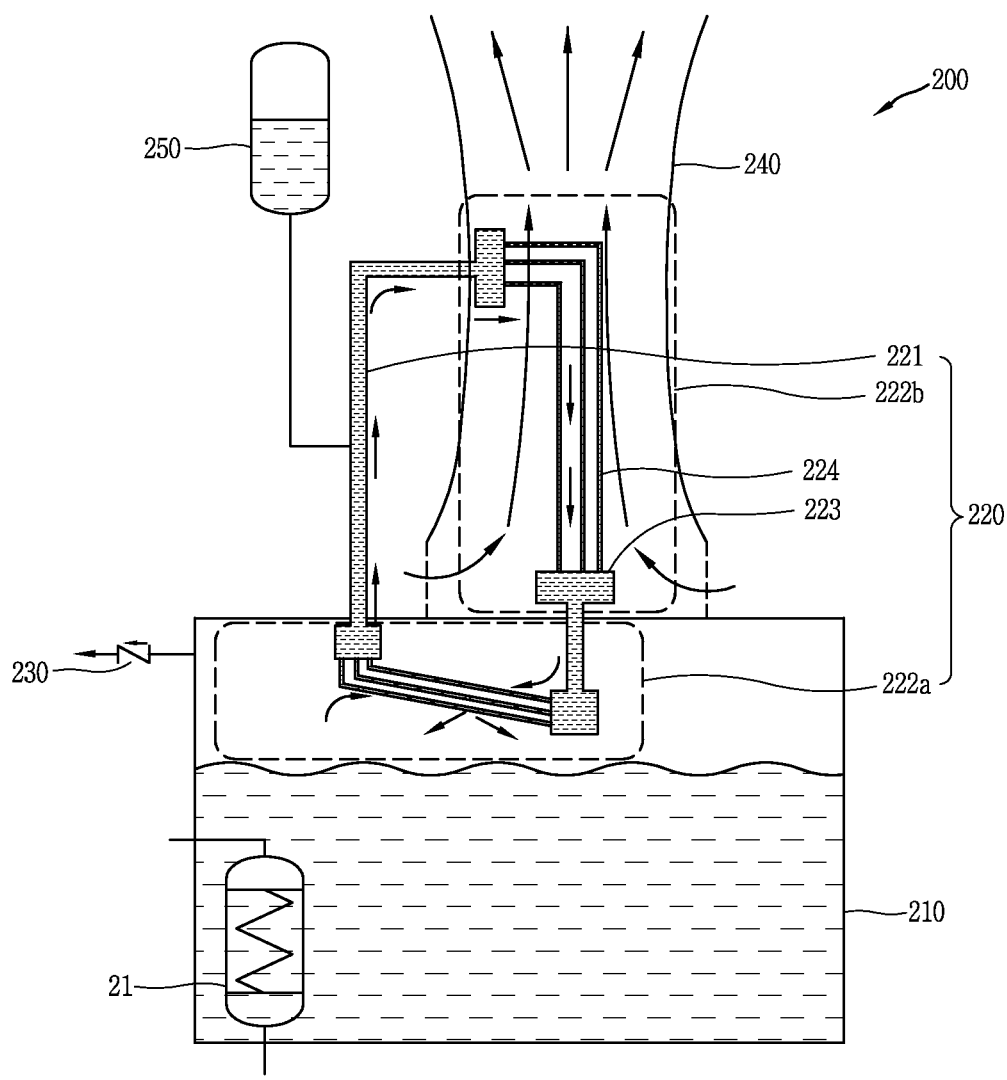
FIG. 2 is a conceptual view of a cooling system of an emergency cooling tank in accordance with another exemplary embodiment disclosed herein.

FIG. 2 is a conceptual view of an emergency cooling tank cooling system 200 in accordance with another exemplary embodiment disclosed herein. The emergency cooling tank cooling system 200 may include an opening and closing unit 230 and an air circulating unit 240.

A heat exchanging device 220 may employ a cooling method in a manner of a heat exchange between a circulating fluid and steam or air by circulating the circulating fluid within a closed loop. The heat exchanging device 220 may include a connecting line 221, a first heat exchanger 222a installed within an emergency cooling tank 210, and a second heat exchanger 222b installed outside the emergency cooling tank 210. A condensation heat exchanger 21 may be installed in the emergency cooling tank 210.

The first heat exchanger 222a may be installed in the emergency cooling tank 210. Here, the first heat exchanger 222a may be disposed at a position higher than a water level of cooling water to carry out the heat exchange with steam or air within the emergency cooling tank 210. The circulating fluid flowing in the heat exchanging device 220 may receive heat transferred from the steam or air within the emergency cooling tank 210 while passing through the first heat exchanger 222a. The circulating fluid may increase in temperature due to receiving the transferred heat.

The first heat exchanger 222a may have at least a part inclined along the flowing direction of the circulating fluid, as illustrated, so as to allow for natural circulation of the circulating fluid to rise up due to a reduced density, which results from the increased temperature.

The second heat exchanger 222b may be installed at the outside of the emergency cooling tank 210 such that the circulating fluid receiving the transferred heat from the first heat exchanger 222a can be cooled by the heat exchange with air. The second heat exchanger 222b may be connected to the first heat exchanger 222a by the connecting line 221 to form a closed loop, such that the circulating fluid can circulate within the closed loop.

The second heat exchanger 222b may be connected to the first heat exchanger 222a by extending downward such that the circulating fluid with the increased density due to the decreased temperature, which results from the heat transfer to the air, can be discharged into the first heat exchanger 222a. The circulating fluid flowing along the closed loop may circulate along the heat exchanging device 220 by natural convection.

Each of the first heat exchanger 222a and the second heat exchanger 222b may include a tube 224 and headers 223. The tube 224 may be formed in a form of tube bundle to ensure a sufficient heat-exchange area. The headers 223 may be installed at an inlet and an outlet of the tube 224, respectively, to distribute the circulating fluid into the tube bundle or join the distributed circulating fluids.

The emergency cooling tank cooling system 200 may further include a pressurizer 250, which is connected to a connecting line for preventing overpressure of the heat exchanging device 220. The pressurizer 250 may accommodate the circulating fluid expanded or contracted by heat. When the circulating fluid is introduced into the pressurizer 250 via the connecting line, internal pressure of the connecting line may be lowered, thereby preventing the overpressure of the heat exchanging device 220.

The pressurizer 250 may be formed in a shape of a refilling tank for storing refilling water, and filled with the makeup water to supplement the circulating fluid circulating along the heat exchanging device 220. Upon long-term cooling of a nuclear reactor, some of the fluid flowing in the heat exchanging device 220 may be leaked. This may cause a failure of an entire function of the emergency cooling tank cooling system 200.

To resolve such problem, the pressurizer 250 may be connected to the heat exchanging device 220 to supply the makeup water. Specifically, the pressurizer 250 has a property to maintain a pressure balance with the heat exchanging device 220. Accordingly, when the heat exchanging device 220 is over-pressurized, the pressurizer 250 may allow the circulating fluid to be introduced into the pressurizer 250 to passively lower the pressure of the heat exchanging device 220. Also, even when the heat exchanging device 220 suffers from the shortage of the circulating fluid, the pressurizer 250 may passively supply the makeup water filled therein into the heat exchanging device 220.

Figure 3:
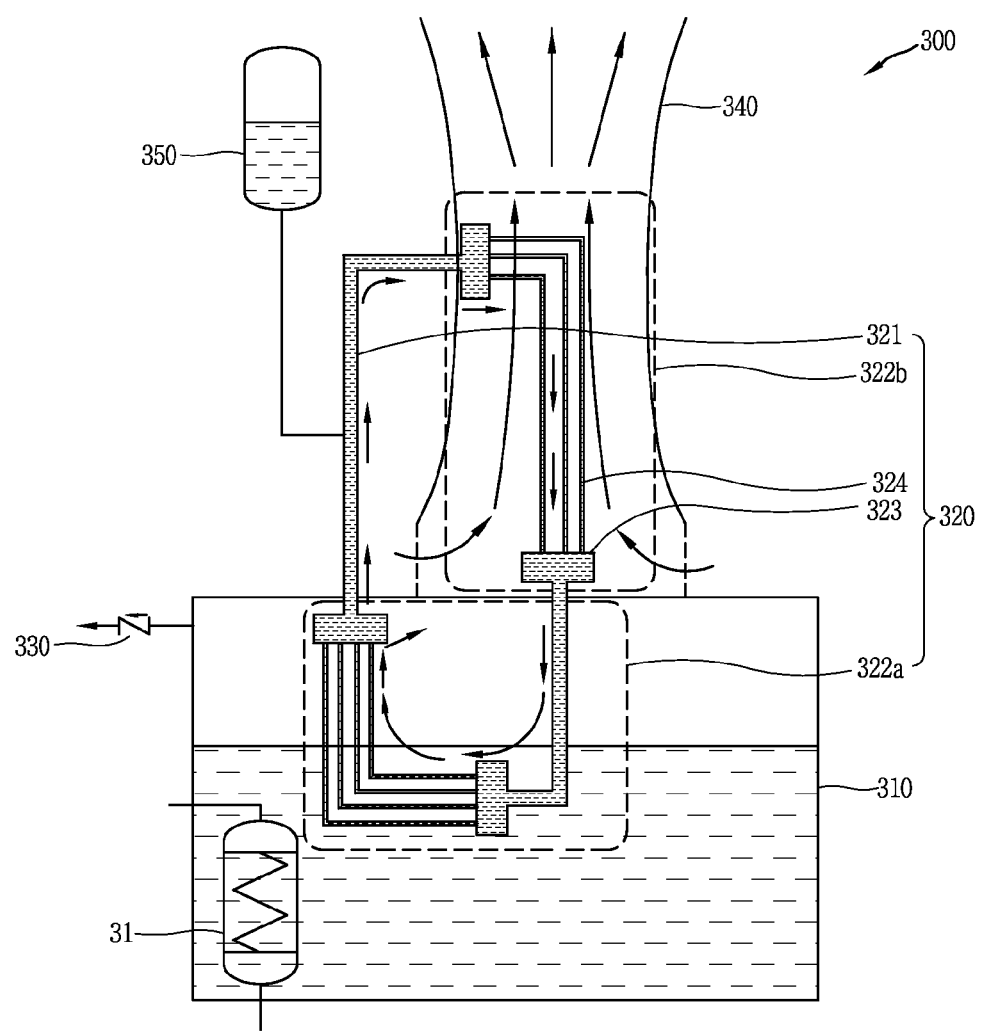
FIG. 3 is a conceptual view of a cooling system of an emergency cooling tank in accordance with another exemplary embodiment disclosed herein.

FIG. 3 is a conceptual view of an emergency cooling tank cooling system 300 in accordance with another exemplary embodiment disclosed herein. The emergency cooling tank cooling system 300 may include an opening and closing unit 230, an air circulating unit 340, and a pressurizer 350

A heat exchanging device 320 may include a connecting line 321, a first heat exchanger 322a and a second heat exchanger 322b. Specifically, the first heat exchanger 322a may be configured in such a manner that at least part thereof is sunk in cooling water of an emergency cooling tank 310 so as to perform a heat exchange with the cooling water within the emergency cooling tank 310. Each of the first heat exchanger 322a and the second heat exchanger 322b may include a tube 324 and headers 323. A condensation heat exchanger 31 may be installed in the emergency cooling tank 310.

When the first heat exchanger 322a is partially sunk in the cooling water, as illustrated, a circulating fluid passing through the first heat exchanger 322a may first perform a heat exchange with the cooling water of the emergency cooling tank 310. Then a direction that the circulating fluid flows may be turned to an upward way along a flow line such that the circulating fluid can rise up with performing the heat exchange with steam.

The first heat exchanger 322a may also have at least a part inclined along the flowing direction of the circulating fluid, as illustrated, so as to allow natural circulation of the circulating fluid to rise up due to a reduced density, which results from an increased temperature.

A case where the first heat exchanger 322a is sunk in the cooling water and a case where it is not sunk in the cooling water may exhibit a difference in cooling efficiency of the heat exchanging device. Also, an installation position of the first heat exchanger 322a is a design option which may be selectively used according to a required cooling efficiency.

Figure 4A:
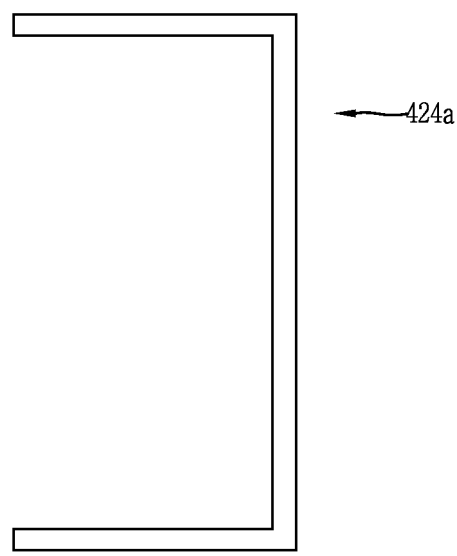
FIGS. 4A to 4C are conceptual views illustrating a tube of a heat exchanger.
Figure 4B:
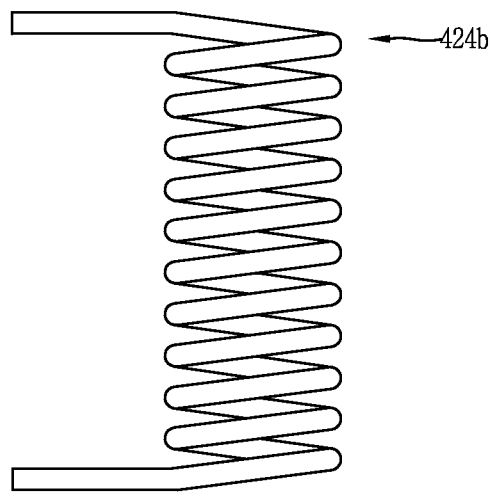
Figure 4C:
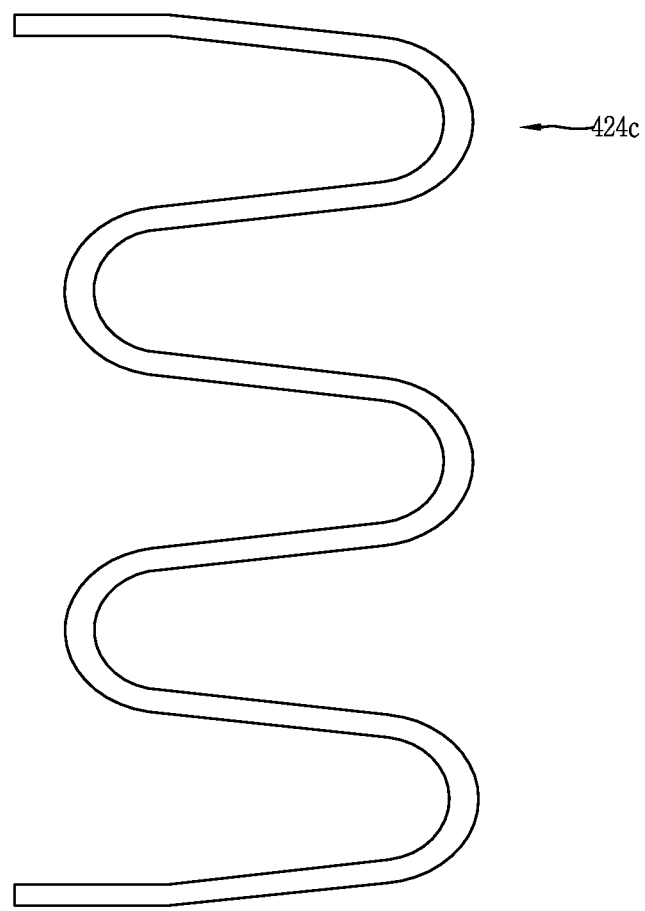

FIGS. 4A to 4C are conceptual views illustrating alternative embodiments of a tube of a heat exchanger.

A tube may be formed in a simple shape of a straight pipe 424a, as illustrated in FIG. 4A, by taking its fabrication into account. However, it may be formed in such a manner that at least part is formed in a helical shape to ensure a sufficient heat-exchange area with air.

The tube may also be formed in a shape of a helical tube 424b illustrated in FIG. 4B, or a combined shape 424c of a curved pipe and a straight pipe illustrated in FIG. 4C. A fluid passing through the helical tube 424b may expect a greater cooling effect than passing through the straight pipe 424a.

A selection and a combination of the shape of the tube 424 may be selective depending on a required cooling efficiency.

Figure 5:
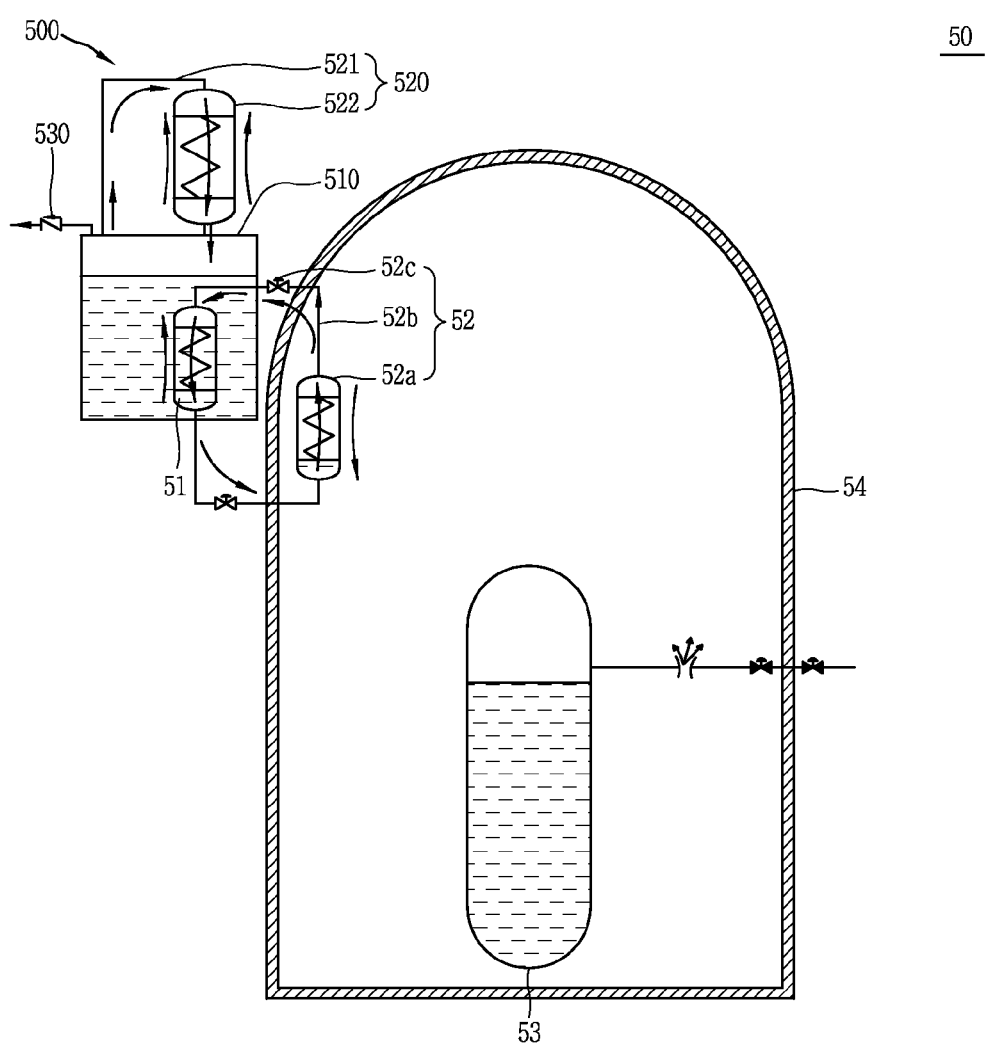
FIG. 5 is a conceptual view of a nuclear power plant having a passive containment (building) cooling system and a cooling system of an emergency cooling tank.

FIG. 5 is a conceptual view of a nuclear power plant 50 having a passive containment (building) cooling system 52 and an emergency cooling tank cooling system 500.

A passive containment cooling system 52 is a safety system which cools and condenses steam emitted into a containment 54 to prevent an increase in pressure of the containment 54 upon an occurrence of an accident, such as a loss of coolant accident (LOCA) or steam line break (SLB) of a nuclear reactor 53. The passive containment cooling system 52 may include a cooling heat exchanger 52a installed in the containment 54 and connected to a condensation heat exchanger 51, a connection line 52b connecting the cooling heat exchanger 52a and the condensation heat exchanger 51, an isolation valve 52c, and a pressurizer (not illustrated).

Due to an accident, such as the LOCA or SLB of the nuclear reactor 53, steam of high temperature and high pressure may be emitted into the containment 54, and the passive containment cooling system 52 may start to operate. A fluid may circulate between the cooling heat exchanger 52a and the condensation heat exchanger 51. The fluid may receive heat transferred from the cooling heat exchanger 52a and transfer the heat from the condensation heat exchanger 51 to an emergency cooling tank 510.

The emergency cooling tank 510 with the transferred heat may discharge the heat to the air according to an operation mechanism of the emergency cooling tank cooling system 500 illustrated in FIGS. 1 to 4. The emergency cooling tank cooling system 500 may include a heat exchanging device 520 (further including a duct 521 and a heat exchanging portion 522) and an opening and closing unit 530.

Figure 6:
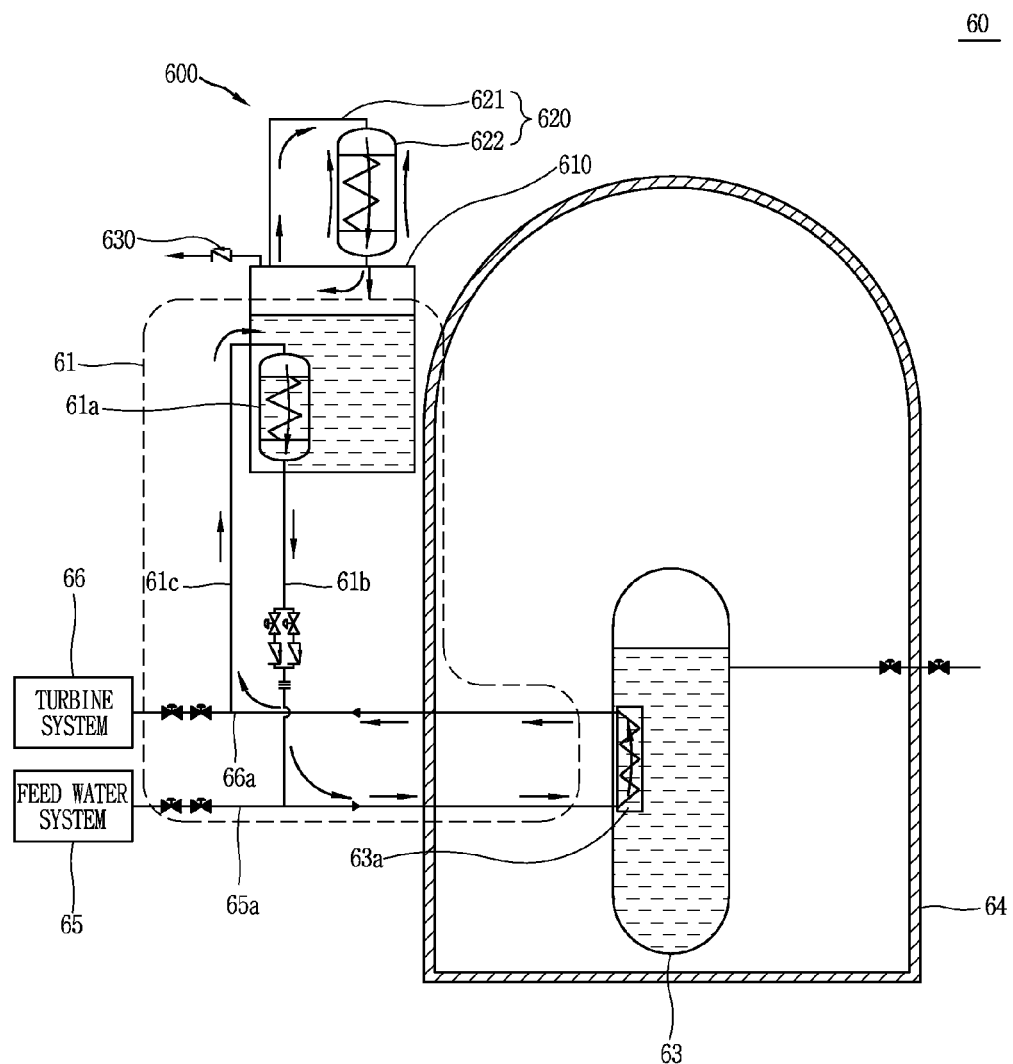
FIG. 6 is a conceptual view of a nuclear power plant having a passive residual heat removal system and a cooling system of an emergency cooling tank.

FIG. 6 is a conceptual view of a nuclear power plant 60 having a passive residual heat removal system 61 and an emergency cooling tank cooling system 600. Nuclear power plant 60 may include containment 64, feed water system 65, and turbine system 66.

A passive residual heat removal system 61 is a safety system which circulates cooling water into a steam generator 63a within a nuclear reactor 63 when an accident happens in the nuclear reactor 63, so as to remove sensible heat of the nuclear reactor 63 and residual heat of a core. A lower end and an upper end of a condensation heat exchanger 61a may be connected to a water supply line 65a and a steam line 66a by connection lines 61b and 61c, respectively. Cooling water may transfer heat, which is transferred from the steam generator 63a through the water supply line 65a and the steam line 66a, from the condensation heat exchanger 61a, into an emergency cooling tank 610.

The emergency cooling tank 610 with the transferred heat may discharge the heat to the air according to the operation mechanism of the emergency cooling tank cooling system 600 illustrated in FIGS. 1 to 4. The emergency cooling tank cooling system 600 may include a heat exchanging device 620 (further including a duct 621 and a heat exchanging portion 622) and an opening and closing unit 630.

Figure 7:
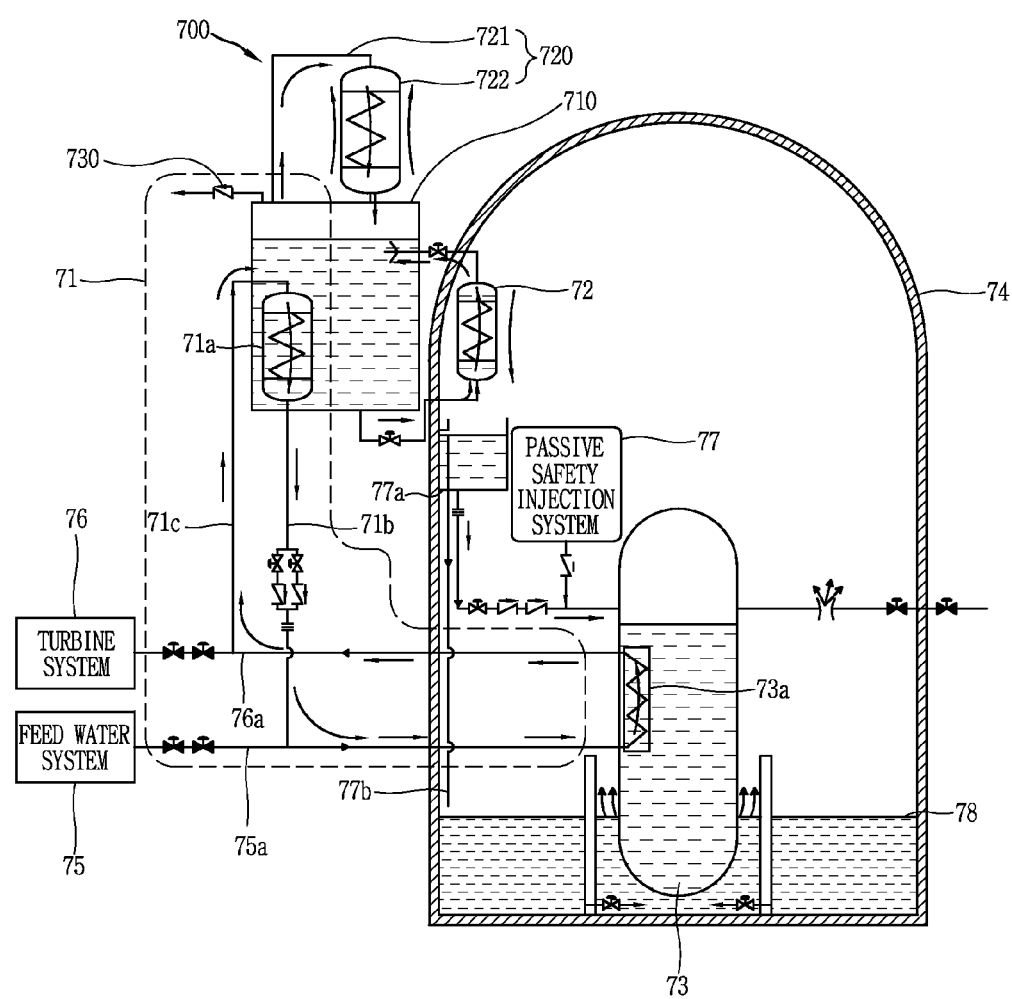
FIG. 7 is a conceptual view of a nuclear power plant having a passive residual heat removal system, a passive containment cooling system, and a cooling system of an emergency cooling tank.

FIG. 7 is a conceptual view of a nuclear power plant 70 having a passive residual heat removal system 71, a passive containment (building) cooling system 72, and an emergency cooling tank cooling system 700.

Heat of a nuclear reactor 73 and a containment 74 may be transferred from a passive residual heat removal system 71 and a passive containment cooling system 72 to an emergency cooling tank 710. The emergency cooling tank 710 may then operate as an integrated heat sink of the passive residual heat removal system 71 and the passive containment cooling system 72.

The emergency cooling tank cooling system 700 proposed herein may be configured to allow for long-term cooling. As illustrated in FIG. 7, it may function as the integrated heat sink of the passive residual heat removal system 71 and the passive containment cooling system 72, which may facilitate for optimization of cooling capacity.

The nuclear power plant 70 may further include a passive safety injection system 77 which injects cooling water into the nuclear reactor 73 to maintain a water level of the cooling water of the nuclear reactor 73, in addition to the passive residual heat removal system 71, the passive containment cooling system 72, and the emergency cooling tank cooling system 700.

Condensed water by the operation of the passive containment cooling system 72 may be collected back into a water collecting tank 77a of the passive safety injection system 77 and then re-injected into a nuclear reactor 73. Accordingly, the cooling water may circulate along the nuclear reactor 73 and the passive safety injection system 77, which may allow for semi-permanently maintaining a water level of the nuclear reactor 73.

Also, the passive residual heat removal system 71 and the passive containment cooling system 72 can semi-permanently discharge the heat of the nuclear reactor 73 and the containment 74 to the air through the emergency cooling tank cooling system 700. Therefore, when the nuclear power plant 70 includes the emergency cooling tank cooling system 700, the passive residual heat removal system 71, the passive containment cooling system 72, and the passive safety injection system 77, safety of the nuclear power plant 70 can be enhanced.

The nuclear power plant 70 may further include a refueling pool 78 installed in the containment 74. Specifically, the refueling pool 78 illustrated in FIG. 7 may be configured in such a manner that the condensed water is introduced from the water collecting tank 77a of the passive safety injection system 77 through a water supply line 77b. The water supply line 77b may extend up to a preset height within the water collecting tank 77a, such that the condensed water exceeding the height of the water supply line 77b can be introduced into the water supply line 77b to flow into the refueling pool 78.

Therefore, the condensed water collected in the water collecting tank 77a may be used partially for safe injection of the nuclear reactor 73 and partially for cooling a lower portion of the nuclear reactor 73 by use of the refueling pool 78.

Figure 8:
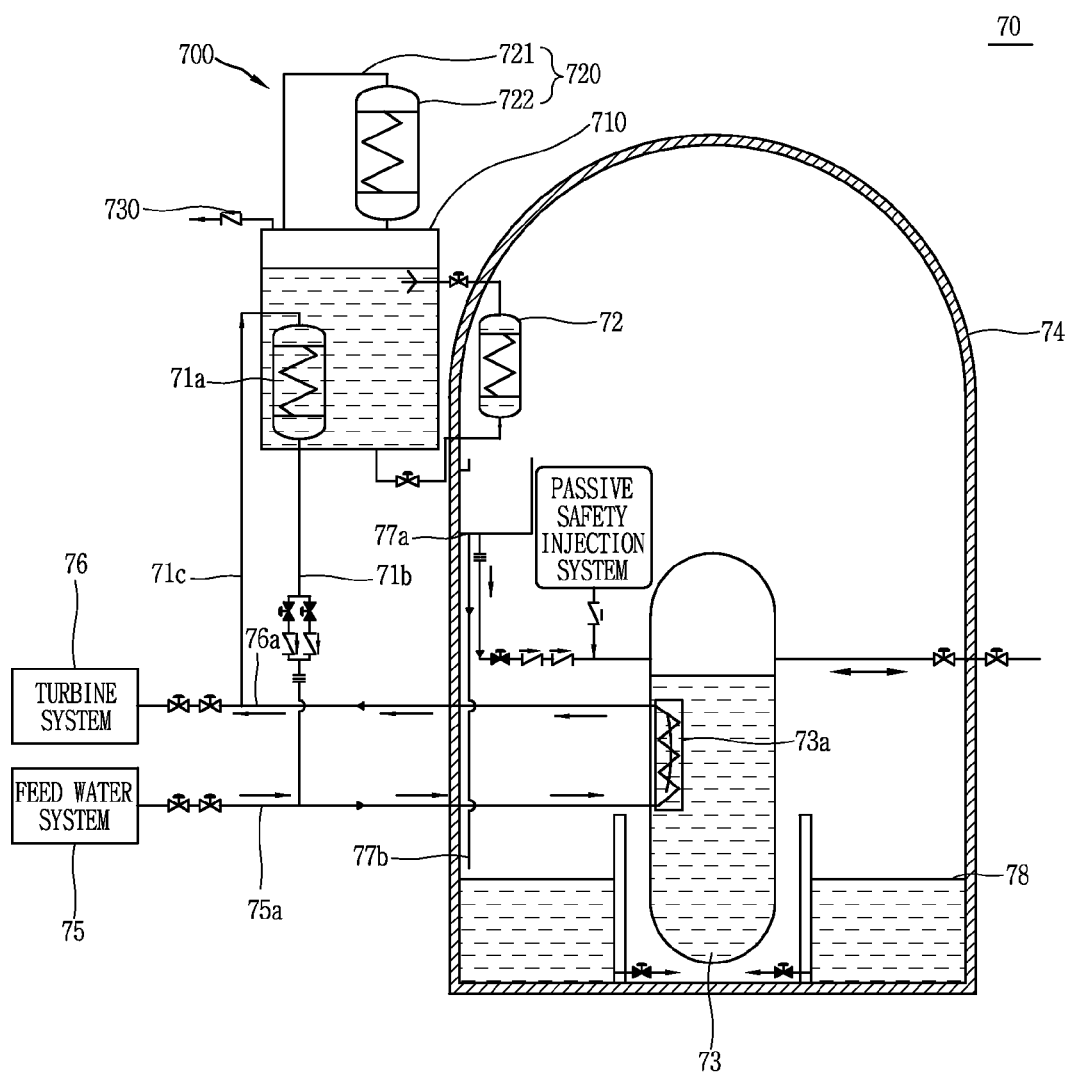
FIG. 8 is a conceptual view illustrating a normal operation state of the nuclear power plant of FIG. 7.

FIG. 8 is a conceptual view illustrating a normal operation state of the nuclear power plant 70 of FIG. 7.

At a normal operation of the nuclear power plant 70, a feed water system 75 may supply water to a steam generator 73a through a feed water line 75a, and the steam generator 73a may convert the supplied water into steam of high temperature using heat supplied from a core. The steam of high temperature may then be transferred to a turbine system 76 through the steam line 76a such that the turbine system 76 can produce electricity.

The emergency cooling tank cooling system 700, the passive residual heat removal system 71 (including connection lines 71b and connection lines 71c), the passive containment cooling system 72, the passive safety injection system 77, and the refueling pool 78 are all safety facilities for handling an occurrence of an accident in the nuclear power plant 70. Therefore, they may not operate in a normal operation state.

Figure 9:
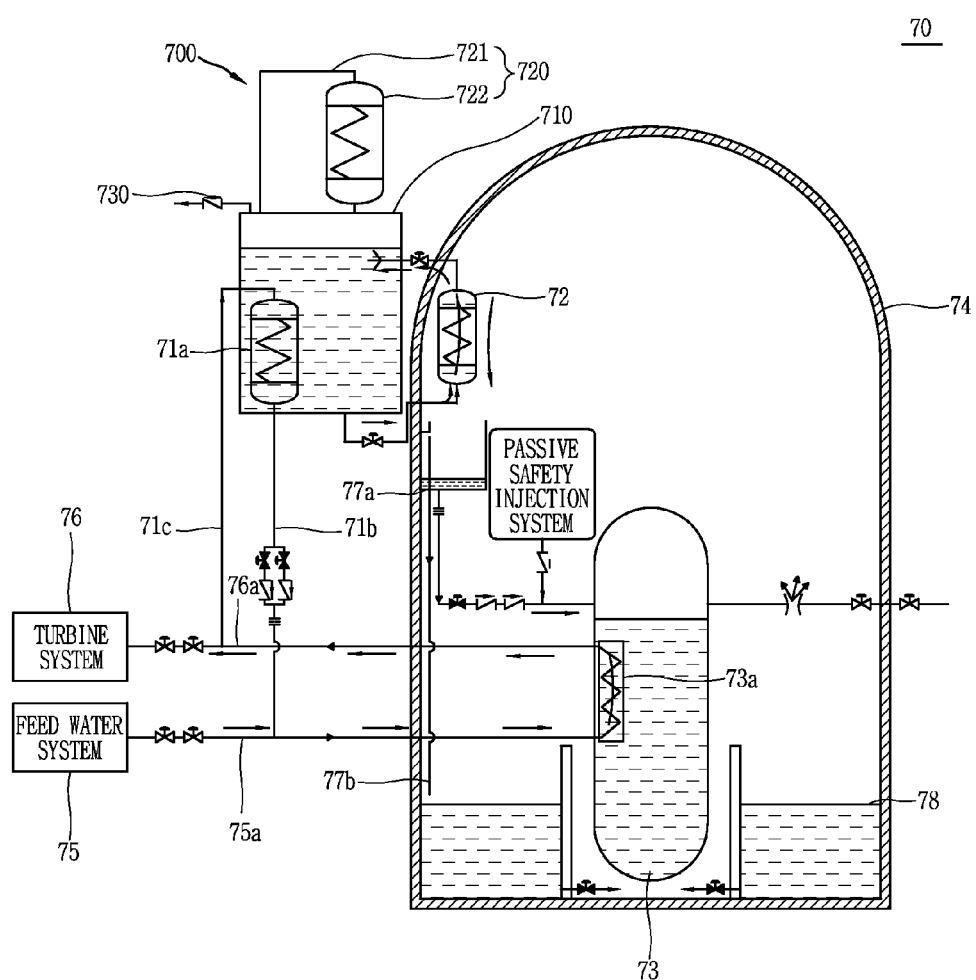
FIG. 9 is a conceptual view illustrating operations of the passive containment cooling system and the cooling system of the emergency cooling tank prior to an operation of the passive residual heat removal system upon an occurrence of a loss of coolant accident (LOCA) in the nuclear power plant illustrated in FIG. 7.

FIG. 9 is a conceptual view illustrating operations of the passive containment cooling system 72 and the emergency cooling tank cooling system 700 prior to an operation of the passive residual heat removal system 71 upon an occurrence of a loss of coolant accident (LOCA) in the nuclear power plant 70 illustrated in FIG. 7.

When the LOCA occurs in the nuclear reactor 73 due to a line break or the like, steam may be emitted into the containment 74 through a broken portion and accordingly internal pressure and internal temperature of the containment 74 may increase.

The passive containment cooling system 72 may start to operate by a temperature difference from the steam emitted to the containment 74. Hence, even before the start of the operation of the passive residual heat removal system 71 or the passive safety injection system 77, the passive containment cooling system 72 may provide a function of preventing an increase in pressure and temperature of the containment 74.

The heat, which is transferred to the emergency cooling tank 710 through the passive containment cooling system 72, may be emitted to the air through the emergency cooling tank cooling system 700. Specifically, in the early stage of an accident, a heat load exceeding a cooling capacity of the emergency cooling tank 710 is transferred to the emergency cooling tank 710. Accordingly, the emergency cooling tank 710 may treat the heat load by externally discharging some of steam, which is generated in response to the evaporation of the cooling water, through an opening and closing unit 730.

Figure 10:
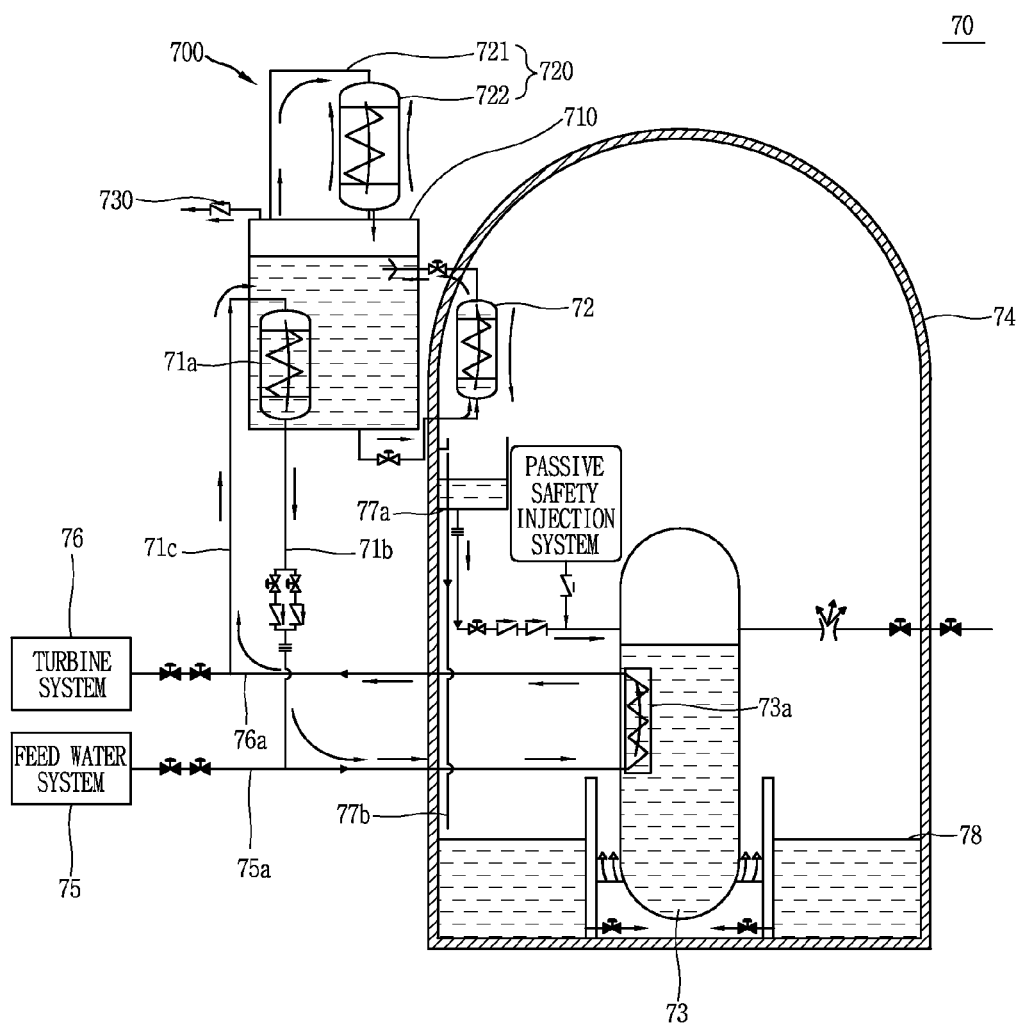
FIG. 10 is a conceptual view illustrating operations of a passive safety injection system, the passive residual heat removal system, the passive containment cooling system and the cooling system of the emergency cooling tank, in addition to FIG. 9.

FIG. 10 is a conceptual view illustrating operations of the passive safety injection system 77, the passive residual heat removal system 71, the passive containment cooling system 72 and the emergency cooling tank cooling system 700, in addition to FIG. 9.

As a time elapses after an occurrence of the LOCA of the nuclear reactor 73, the pressure or temperature of the nuclear reactor 73 may start to gradually be lowered. When the pressure or temperature is dropped below a preset value, a related system may transfer an open signal to isolation valves of the passive residual heat removal system 71 and the passive safety injection system 77.

In turn, the passive residual heat removal system 71 may continuously remove sensible heat of the nuclear reactor and residual heat of a core by circulating water to the steam generator 73a, and transfer the removed heat to the emergency cooling tank 710 through the condensation heat exchanger 71a.

The passive safety injection system 77 may also inject the cooling water into the nuclear reactor 73 in response to its isolation valve being open by an activation signal. Here, the injected cooling water may be at least one of cooling water filled in several tanks of the passive safety injection system 77 and condensed water collected in the water collecting tank 77a.

The heat, which has been transferred to the emergency cooling tank 710 responsive to the operations of the passive residual heat removal system 71 and the passive containment cooling system 72, may be emitted to the air through the emergency cooling tank cooling system 700. In a state where a heat load transferred to the emergency cooling tank 710 is still greater than the cooling capacity of the emergency cooling tank 700, the emergency cooling tank cooling system 700 may maintain an open state of the opening and closing unit 730, so as to emit the steam and treat the heat load by evaporation heat.

Figure 11:
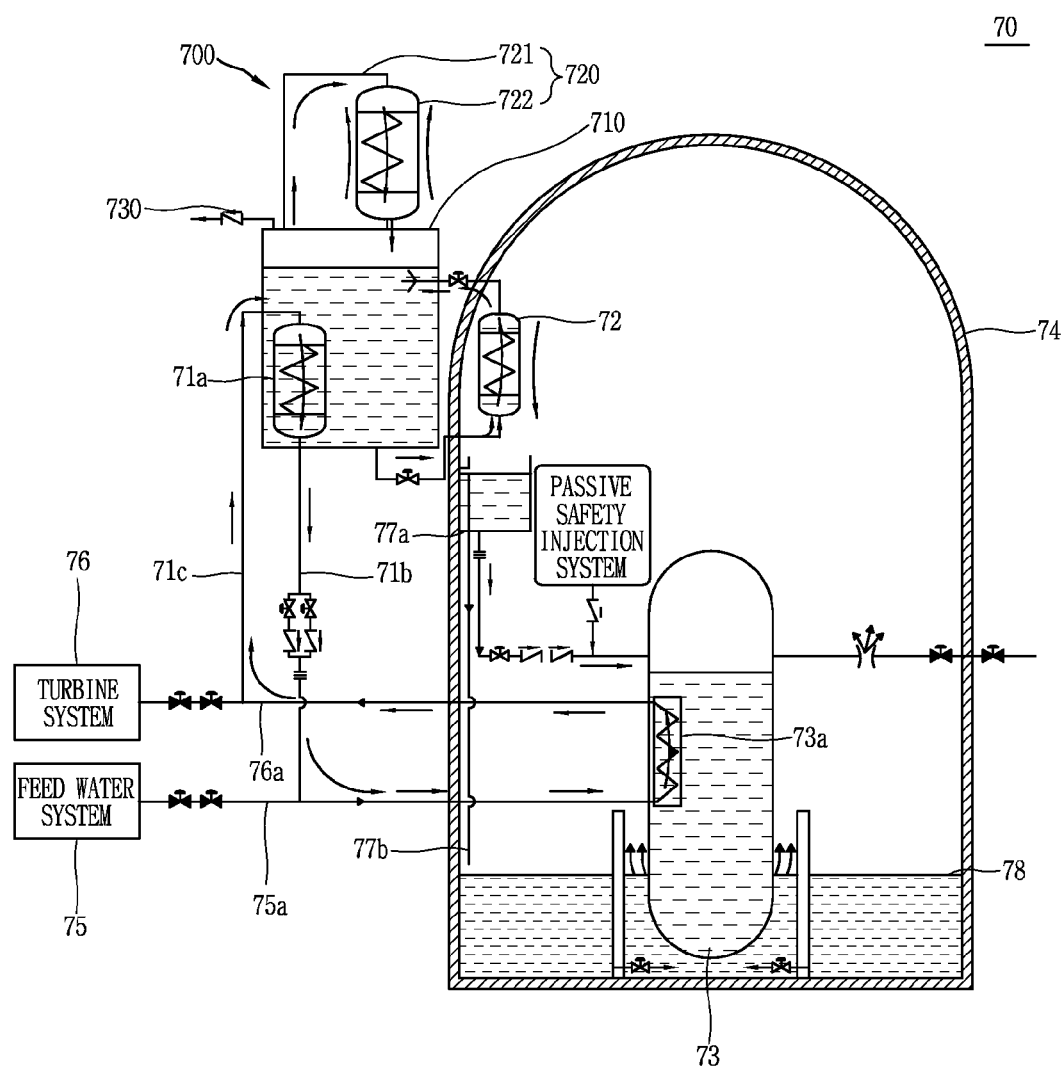
FIG. 11 is a conceptual view illustrating long-term cooling of the passive safety injection system, the passive residual heat removal system, the passive containment cooling system and the cooling system of the emergency cooling tank, in addition to FIG. 10.

FIG. 11 is a conceptual view illustrating long-term cooling of the passive safety injection system 77, the passive residual heat removal system 71, the passive containment cooling system 72 and the emergency cooling tank cooling system 700, in addition to FIG. 10.

The passive residual heat removal system 71, the passive containment cooling system 72, and the passive safety injection system 77 may continue to operate. Specifically, the passive safety injection system 77 may maintain a water level of the nuclear reactor 73 for a long term of time by using the condensed water collected.

At the time point that the heat load lower than the cooling capacity of the emergency cooling tank 710 is transferred to the emergency cooling tank 710, the opening and closing unit 730 may be closed and the emission of the steam may be stopped. Accordingly, from the time point that the opening and closing unit 730 is closed, the heat load may be treated only by the heat exchanging device 720 and a quantity of cooling water of the emergency cooling tank cooling system 700 may be maintained in a relatively uniform state. Heat exchanging device 720 may include a duct 721 and a heat exchanging portion 722.

Figure 12:
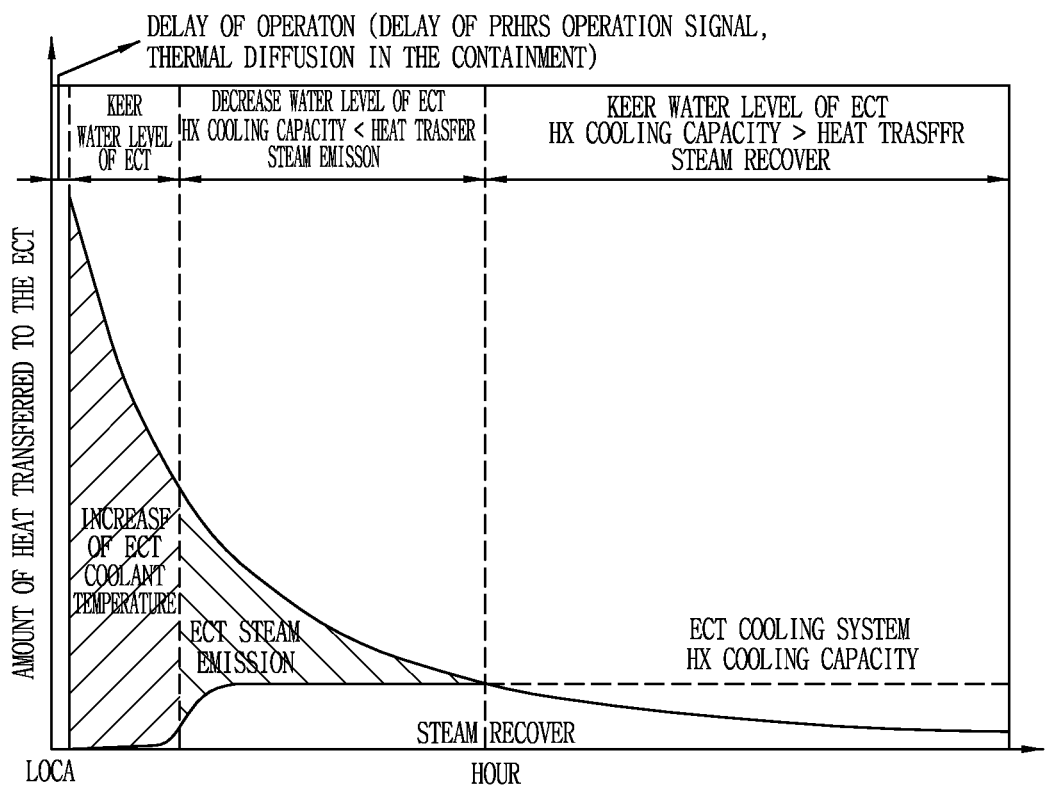
FIG. 12 is a graph illustrating a heat flow of an emergency cooling tank cooling system on the time basis.

FIG. 12 is a graph illustrating a heat flow of an emergency cooling tank cooling system on the time basis.

A horizontal axis of a graph denotes a time, and a vertical axis denotes a quantity of heat transferred.

When a LOCA occurs due to a line break or the like, an operation signal of the passive residual heat removal system may be delayed or a time may be spent somewhat for thermal diffusion within the containment. As a result, an operation delay of the emergency cooling tank cooling system may be caused at the early beginning of an accident occurrence.

When the passive containment cooling system starts to operate in response to the generation of the operation signal of the passive residual heat removal system or the thermal diffusion within the containment, the heat may be transferred to the emergency cooling tank and the emergency cooling tank cooling system may start to operate.

The cooling water contained in the emergency cooling tank may absorb the heat so as to increase in temperature. However, until before the cooling water is changed into a phase of steam and then evaporated, a water level of the cooling water of the emergency cooling tank may be maintained.

In the early stage of the accident, the heat which is transferred to the emergency cooling tank through the passive residual heat removal system or the passive containment cooling system may exceed the cooling capacity of the emergency cooling tank cooling system. When the heat load transferred to the emergency cooling tank exceeds the cooling capacity of the emergency cooling tank cooling system, the opening and closing unit may be open and steam may be externally emitted from the emergency cooling tank so as to discharge the heat load. The water level of the cooling water of the emergency cooling tank may be lowered as low as the steam being emitted.

While emitting the steam, some of the condensed water may be collected again from the steam by the operation of the heat exchanging device. A quantity of the condensed water collected may theoretically correspond to the cooling capacity of the emergency cooling tank cooling system.

When the quantity of heat transferred to the emergency cooling tank is decreased below the cooling capacity of the emergency cooling tank cooling system, the opening and closing unit may be closed and the steam collection by the cooling of the heat exchanging device may be continued. The water level of the cooling water of the emergency cooling tank may be maintained and accordingly, long-term cooling of the nuclear power plant may be allowed.

The configurations and methods of the emergency cooling tank cooling system and the nuclear power plant having the same in the aforesaid embodiments may not be limitedly applied, but such embodiments may be configured by a selective combination of all or part of the embodiments so as to implement many variations.

According to the present disclosure having the configurations, upon an occurrence of an accident, the cooling water filled in the emergency cooling tank may maintain its water level without being run out even by a long-term operation of the emergency cooling tank, thereby removing sensible heat and residual heat discharged from the nuclear reactor for an extended time.

Also, the sensible heat and the residual heat discharged from the nuclear reactor can be removed for a long term of time using the emergency cooling tank, which is a system of an atmospheric pressure level, without increasing a capacity of the heat exchanger of the passive residual heat removal system or the passive containment cooling system, which is a system of high pressure. This may result in improvement of economical efficiency and safety.

What is claimed is:

1. A cooling system of an emergency cooling tank, comprising:
    an emergency cooling tank configured to store cooling water therein, the cooling water receiving heat, transferred from a nuclear reactor or a containment, when an accident occurs in the nuclear reactor;
    a heat exchanging device installed to be exposed to an outside of the emergency cooling tank to operate in air, and configured to externally emit heat by way of a heat exchange between a fluid within the emergency cooling tank and the air such that the operation of the emergency cooling tank is continued even without refilling the cooling water; and
    an opening and closing unit installed at the emergency cooling tank to be located higher than a water level of the cooling water for emitting the fluid, and configured to be open by a flow of the fluid generated by an evaporation of the cooling water, the flow being formed due to a pressure difference from external air at pressure higher than a preset pressure, such that some of the fluid is externally emitted when a heat load exceeding a cooling capacity of the emergency cooling tank is transferred, wherein
    the heat exchanging device is designed to have a cooling capacity that is smaller than a heat load transferred to the emergency cooling at an early stage of the accident and greater than a heat load transferred to the emergency cooling tank at a later stage of the accident,
    the opening and closing unit is configured to be passively opened when a heat load exceeding the cooling capacity of the heat exchanging device is transferred to the emergency cooling tank at the early stage of the accident, and
    the opening and closing unit is configured to be passively closed when a heat load transferred to the emergency cooling tank drops below the cooling capacity of the heat exchanging device at the later stage of the accident,
    the heat exchanging device is installed in an upper side of the emergency cooling tank and comprises:
        a duct installed on an uppermost wall of the emergency cooling tank and extending upwardly to provide an upward flow path to steam generated by an evaporation of the cooling water within the emergency cooling tank;
        a heat exchanging portion configured to perform the heat exchange with air to cool and condense the steam introduced through the duct, the heat exchanging portion being connected to the emergency cooling tank to collect condensed fluid which has lost heat and flows down due to a density difference, and
    an air circulating unit installed vertically above and on top of the emergency cooling tank such that the uppermost wall of the emergency cooling lank is shared with a lowermost wall of the air circulating unit, the air circulating unit allowing air introduced through a lower side portion thereof to flow up therealong so as to increase a heat exchange rate of the heat exchanging device by natural convection.

2. The cooling system of claim 1, wherein the heat exchanging portion has at least part formed in a straight pipe, a curved pipe, or in a helical shape.

3. The cooling system of claim 1,
wherein the air circulating unit is installed in a manner of covering at least part of the heat exchanging device.

4. The cooling system of claim 1, wherein the opening and closing unit is implemented as a type of check valve or flap valve, which is passively open at pressure higher than a preset pressure formed by the fluid within the emergency cooling tank.

5. The cooling system of claim 1, wherein the opening and closing unit prevents the emission of steam when a heat load transferred to the emergency cooling tank is reduced below the cooling capacity of the emergency cooling tank, and is passively closed at pressure lower than a preset pressure to maintain a quantity of the cooling water of the emergency cooling tank.

6. A nuclear power plant, comprising:
a passive containment cooling system configured to condense steam discharged from a nuclear reactor into a containment to prevent an increase in pressure of the containment when an accident occurs in the nuclear reactor; and
an emergency cooling tank cooling system configured to receive sensible heat and residual heat of the nuclear reactor, transferred from the passive containment cooling system, and externally emit the received heat,
wherein the emergency cooling tank cooling system comprises:
an emergency cooling tank configured to store cooling water therein, the cooling water receiving heat, transferred from a nuclear reactor or a containment, when an accident occurs in the nuclear reactor;
a heat exchanging device installed at an outside of the emergency cooling tank in an exposed manner to operate in the air, and configured to externally emit heat by way of a heat exchange between fluid within the emergency cooling tank and the air such that the operation of the emergency cooling tank is continued even without refilling the cooling water; and
an opening and closing unit installed at the emergency cooling tank to be located higher than a water level of the cooling water for emitting the fluid, and configured to be open by a flow of the fluid generated by an evaporation of the cooling water, the flow being formed due to a pressure difference from external air at pressure higher than a preset pressure, such that some of the fluid is externally emitted when a heat load exceeding a cooling capacity of the emergency cooling tank is transferred, wherein
the heat exchanging device is designed to have a cooling capacity that is smaller than a heat load transferred to the emergency cooling at an early stage of the accident and greater than a heat load transferred to the emergency cooling tank at a later stage of the accident,
the opening and closing unit is configured to be passively opened when a heat load exceeding the cooling capacity of the heat exchanging device is transferred to the emergency cooling tank at the early stage of the accident, and
the opening and closing unit is configured to be passively closed when a heat load transferred to the emergency cooling tank drops below the cooling capacity of the heat exchanging device at the later stage of the accident,
the heat exchanging device is installed in an upper side of the emergency cooling tank and comprises:
a duct installed on an uppermost wall of the emergency cooling tank and extending upwardly to provide an upward flow path to the fluid within the emergency cooling tank;
a heat exchanging portion configured to perform the heat exchange with air to cool or condense the fluid introduced through the duct, the heat exchanging portion being connected to the emergency cooling tank to collect the fluid which has lost heat and flows down due to a density difference, and
an air circulating unit installed vertically above and on top of the emergency cooling tank such that the uppermost wall of the emergency cooling tank is shared with a lowermost wall of the air circulating unit, the air circulating unit allowing air introduced through a lower side portion thereof to flow up therealong so as to increase a heat exchange rate of the heat exchanging device by natural convection.

7. A nuclear power plant, comprising:
a passive residual heat removal system configured to remove sensible heat and residual heat of a nuclear reactor by circulating cooling water when an accident occurs in the nuclear reactor; and
an emergency cooling tank cooling system configured to receive sensible heat and residual heat of the nuclear reactor, transferred from the passive residual heat removal system, and externally emit the received heat,
wherein the emergency cooling tank cooling system comprises:
an emergency cooling tank configured to store cooling water therein, the cooling water receiving heat, transferred from a nuclear reactor or a containment, when an accident occurs in the nuclear reactor;
a heat exchanging device installed at an outside of the emergency cooling tank in an exposed manner to operate in the air, and configured to externally emit heat by way of a heat exchange between fluid within the emergency cooling tank and the air such that the operation of the emergency cooling tank is continued even without refilling the cooling water; and
an opening and closing unit installed at the emergency cooling tank to be located higher than a water level of the cooling water for emitting the fluid, and configured to be open by a flow of the fluid generated by an evaporation of the cooling water, the flow being formed due to a pressure difference from external air at pressure higher than a preset pressure, such that some of the fluid is externally emitted when a heat load exceeding a cooling capacity of the emergency cooling tank is transferred, wherein
the heat exchanging device is designed to have a cooling capacity that is smaller than a heat load transferred to the emergency cooling at an early stage of the accident and greater than a heat load transferred to the emergency cooling tank at a later stage of the accident,
the opening and closing unit is configured to be passively opened when a heat load exceeding the cooling capacity of the heat exchanging device is transferred to the emergency cooling tank at the early stage of the accident, and
the opening and closing unit is configured to be passively closed when a heat load transferred to the emergency cooling tank drops below the cooling capacity of the heat exchanging device at the latter stage of the accident, the heat exchanging device is installed in an upper side of the emergency cooling tank and comprises:
- a duct installed on an uppermost wall of the emergency cooling tank and extending upwardly to provide an upward flow path to the fluid within the emergency cooling tank;
- a heat exchanging portion configured to perform the heat exchange with air to cool or condense the fluid introduced through the duct, the heat exchanging portion being connected to the emergency cooling tank to collect the fluid which has lost heat and flows down due to a density difference, and an air circulating unit installed vertically above and on top of the emergency cooling tank such that the uppermost wall of the emergency cooling tank is shared with a lowermost wall of the air circulating unit, the air circulating unit allowing air introduced through a lower side portion thereof to flow up therealong so as to increase a heat exchange rate of the heat exchanging device by natural convection.

\* \* \* \* \*